US012606760B2

(12) United States Patent
    Prim

(10) Patent No.: US 12,606,760 B2
(45) Date of Patent: Apr. 21, 2026

(54) ENHANCED OIL RECOVERY STREAMS

(71) Applicant: Pilot Energy Solutions, LLC, Houston, TX (US)

(72) Inventor: Eric Prim, Spring, TX (US)

(73) Assignee: Pilot Energy Solutions, LLC, Houston, TX (US)

( * ) Notice: Subject to any disclaimer, the term of this patent is extended or adjusted under 35 U.S.C. 154(b) by 0 days.

(21) Appl. No.: 17/122,762

(22) Filed: Dec. 15, 2020

(65) Prior Publication Data

US 2021/0102134 A1 Apr. 8, 2021

Related U.S. Application Data

(63) Continuation of application No. 16/733,977, filed on Jan. 3, 2020, now Pat. No. 10,899,987, which is a
    (Continued)

(51) Int. Cl.
    C10L 3/12 (2006.01)
    B01D 3/14 (2006.01)
    (Continued)

(52) U.S. Cl.
    CPC ............... C10L 3/12 (2013.01); B01D 3/143 (2013.01); C10G 5/06 (2013.01); E21B 43/164 (2013.01);
    (Continued)

(58) Field of Classification Search
    CPC .... C10L 3/12; C10L 2290/06; C10L 2290/08; C10L 2290/10; C10L 2290/24; C10L 2290/48; C10L 2290/541; C10L 2290/543; B01D 3/143; B01D 2257/504; C10G 5/06; E21B 43/164; C09K 8/594
    See application file for complete search history.

(56) References Cited

U.S. PATENT DOCUMENTS 4,070,165 A 1/1978 Colton
4,318,723 A 3/1982 Holmes et al.
(Continued)

OTHER PUBLICATIONS

The University of Texas of the Permian Basin; "CO2 Facilities and Plants" Ceed CO2 Flooding Shortcourse No. 7; Center for Energy and Economic Diversification; Dec. 8, 1998; 214 pages.
(Continued)

*Primary Examiner* — Thuan D Dang
(74) *Attorney, Agent, or Firm* — Conley Rose, P.C.; Grant Rodolph; Nicholas K. Beaulieu

(57) ABSTRACT

A method for recovering hydrocarbons includes receiving a carbon dioxide recycle stream. The carbon dioxide recycle stream is separated into a purified carbon dioxide recycle stream and a natural gas liquids stream. The purified carbon dioxide recycle stream includes carbon dioxide and a first portion of $C_3$ hydrocarbons from the carbon dioxide recycle stream. The natural gas liquids stream includes natural gas liquids and a second portion of the $C_3$ hydrocarbons from the carbon dioxide recycle stream. The second portion of the $C_3$ hydrocarbons contains a molar percentage of $C_3$ hydrocarbons that is greater than a molar percentage of $C_3$ hydrocarbons of the first portion of the $C_3$ hydrocarbons.

23 Claims, 2 Drawing Sheets

Related U.S. Application Data continuation of application No. 16/304,854, filed as application No. PCT/US2016/035501 on Jun. 2, 2016, now Pat. No. 10,844,304.

(51) Int. Cl.
| | |
|---|---|
| *C10G 5/06* | (2006.01) |
| *E21B 43/16* | (2006.01) |
| *C09K 8/594* | (2006.01) |

(52) U.S. Cl.
CPC ........ *B01D 2257/504* (2013.01); *C09K 8/594* (2013.01); *C10L 2290/06* (2013.01); *C10L 2290/08* (2013.01); *C10L 2290/10* (2013.01); *C10L 2290/24* (2013.01); *C10L 2290/48* (2013.01); *C10L 2290/541* (2013.01); *C10L 2290/543* (2013.01)

(56) References Cited

U.S. PATENT DOCUMENTS

| | | | | |
|---|---|---|---|---|
| 4,417,449 | A | 11/1983 | Hegarty et al. | |
| 4,428,759 | A | 1/1984 | Ryan et al. | |
| 4,462,814 | A | 7/1984 | Holmes et al. | |
| 4,474,591 | A | 10/1984 | Arand et al. | |
| 4,529,411 | A | 7/1985 | Goddin, Jr. et al. | |
| 4,563,202 | A | 1/1986 | Yao et al. | |
| 4,595,404 | A | 6/1986 | Ozero et al. | |
| 4,753,666 | A | 6/1988 | Pastor et al. | |
| 4,976,849 | A | 12/1990 | Soldati | |
| 5,114,689 | A | 5/1992 | Nagji et al. | |
| 6,070,429 | A | 6/2000 | Low et al. | |
| 8,505,332 | B1 | 8/2013 | Prim | |
| 10,844,304 | B2 | 11/2020 | Prim | |
| 2012/0255325 | A1* | 10/2012 | Prim | F25J 3/0233 62/620 |
| 2013/0298601 | A1 | 11/2013 | Prim et al. | |
| 2015/0153101 | A1 | 6/2015 | Gahier et al. | |
| 2020/0140772 | A1 | 5/2020 | Prim | |

OTHER PUBLICATIONS

Jarrell, Perry M., et al.; "Practical Aspects of CO2 Flooding"; Society of Petroleum Engineers (SPE) Monograph Series; vol. 22; Richardson, Texas; 2002; 115 pages.
Office Action dated Aug. 8, 2019; U.S. Appl. No. 16/304,854, filed Nov. 27, 2018; 5 pages.
Office Action dated Jan. 15, 2020; U.S. Appl. No. 16/304,854, filed Nov. 27, 2018; 14 pages.
Notice of Allowance dated Aug. 10, 2020; U.S. Appl. No. 16/304,854, filed Nov. 27, 2018; 12 pages.
Office Action dated Feb. 13, 2020; U.S. Appl. No. 16/733,977, filed Jan. 3, 2020; 6 pages.
Office Action dated Jul. 23, 2020; U.S. Appl. No. 16/733,977, filed Jan. 3, 2020; 10 pages.
Notice of Allowance dated Nov. 24, 2020; U.S. Appl. No. 16/733,977, filed Jan. 3, 2020; 9 pages.
PCT International Search Report; Application No. PCT/US2016/035501; Oct. 18, 2016; 4 pages.
PCT Written Opinion of the International Searching Authority; Application No. PCT/US2016/035501; Oct. 18, 2016; 10 pages.
PCT International Preliminary Report on Patentability; Application No. PCT/US2016/035501; Sep. 17, 2018; 34 pages.
Canadian Office Action; Application No. 3,026,063; Jan. 15, 2020; 4 pages.
Canadian Office Action; Application No. 3,026,063; Sep. 15, 2020; 3 pages.
Canadian Office Action; Application No. 3, 124,235; Oct. 14, 2022; 3 pages.
*Scout Energy Management, LLC, and Chevron U.S.A. Inc., Petitioners* v. *Pilot Intellectual Property, LLC, Patent Owner;* "Petition for Inter Partes Review of U.S. Pat. No. 8,505,332; Case No. IPR2024-00385"; Jan. 23, 2024; 102 pages.
Aycaguer, Anne-Christine, et al.; "Reducing Carbon Dioxide Emissions with Enhanced Oil Recovery Projects: A Life Cycle Assessment Approach"; Energy & Fuels; vol. 15, No. 2; Mar./Apr. 2001; 9 pages.
Ryan, J. M., et al.; "Treating Acid & Sour Gas: CO2 Recovery by the Ryan/Holmes Process"; Chemical Engineering Progress; vol. 80, No. 10; Oct. 1984; 6 pages.
Holmes, A. S., et al.; "Pilot Tests Prove Ryan/Holmes Cryogenic Acid Gas/Hydrocarbon Separations"; Gas Processors Association; Proceedings of the Sixty-First Annual Convention; 1982; 11 pages.
Wankat, Phillip C.; "Chapter 3: Introduction to Column Distillation"; Separation Process Engineering; Second Ed.; Pearson Education, Inc.; 2007; 23 pages.
Radebaugh, Ray; "Cryogenic Technology Resources, About Cryogenics"; The MacMillan Encyclopedia Of Chemistry; New York; 2002; 4 pages.
Kirk-Othmer; "Petroleum"; Kirk-Othmer Encyclopedia of Chemical Technology; Fifth Ed.; vol. 18; 2006; 16 pages.
Morrison, Robert Thornton, et al.; "Chapter 3: Alkanes, Free-Radical Substitution"; Organic Chemistry; Fourth Ed.; 1987; 45 pages.
Perry, Robert H., et al.; "Section 14: Gas Absorption and Gas-Liquid System Design"; Perry's Chemical Engineers' Handbook; Seventh Ed.; Aug. 1997; 23 pages.
DePriester, C. L .; "Light-Hydrocarbon Vapor-Liquid Distribution Coefficients, Pressure-Temperature-Composition Charts and Pressure-Temperature Nomographs"; Applied Thermodynamics; American Institute of Chemical Engineers; vol. 49, No. 7; 1953; 45 pages.
Schlumberger Limited; "Natural Gas Liquids"; Energy Glossary; https://glossary.slb.com/en/terms/n/natural_gas_liquids; Retrieved Jan. 16, 2024; Case No. IPR2024-00385; Exhibit 1023; 2 pages.
Diener, Ralf, et al.; "Sizing of Throttling Device for Gas/Liquid Two-Phase Flow Part 1: Safety Valves"; Process Safety Progress; vol. 23, No. 4; Dec. 2004; 10 pages.
Flynn, A. J.; "Wasson Denver Unit—CO2 Treatment"; Gas Processors Association; Proceedings of the Sixty-Second Annual Convention; San Francisco, California; Mar. 14-16, 1983; 15 pages.
"Declaration of David A. Rockstraw, Ph.D., P. E."; Exhibit 1002, Petition for Inter Partes Review of U.S. Pat. No. 8,505,332, Case No. IPR2024-00385; Jan. 23, 2024; 114 pages.
"Prosecution History of U.S. Pat. No. 8,505,332"; Exhibit 1003 of Petition for Inter Partes Review, U.S. Pat. No. 8,505,332, Case No. IPR2024-00385; Jan. 23, 2024; pp. 1-154.
"Prosecution History of U.S. Pat. No. 8,505,332"; Exhibit 1003, Petition for Inter Partes Review of U.S. Pat. No. 8,505,332, Case No. IPR2024-00385; Jan. 23, 2024; pp. 155-308.
"Declaration of Sylvia D. Hall-Ellis, Ph.D."; Exhibit 1008, Petition for Inter Partes Review of U.S. Pat. No. 8,505,332, Case No. IPR2024-00385; Jan. 23, 2024; 111 pages.
"Plaintiffs Pilot Energy Solutions, LLC and Pilot Intellectual Property, LLC's Original Complaint"; Exhibit 1009, Petition for Inter Partes Review of U.S. Pat. No. 8,505,332, Case No. IPR2024-00385; Jan. 23, 2024; 146 pages.
"Plaintiffs Response in Opposition to Defendants' Motion to Dismiss for Failure to State a Claim Under Frcp 12(B) (6)"; Exhibit 1011, Petition for Inter Partes Review of U.S. Pat. No. 8,505,332, Case No. IPR2024-00385; Jan. 23, 2024; 26 pages.
"Scheduling Order"; Exhibit 1013 of Petition for Inter Partes Review, U.S. Pat. No. 8,505,332, Case No. IPR2024-00385; Jan. 23, 2024; 4 pages.
"Comparison of Districts Within the First Circuit"; Exhibit 1014, Petition for Inter Partes Review of U.S. Pat. No. 8,505,332, Case No. IPR2024-00385; Jan. 23, 2024; 4 pages.
"Curriculum Vitae of Dr. David Rockstraw"; Exhibit 1015, Petition for Inter Partes Review of U.S. Pat. No. 8,505,332, Case No. IPR2024-00385; Jan. 23, 2024; 11 pages.
"Plaintiffs Pilot Energy Solutions, LLC and Pilot Intellectual Property, LLC's Original Complaint"; Civil Action No. 4:23-cv-02505; U.S. District Court Southern District of Texas Houston Division; Jul. 7, 2023; 80 pages.

(56)          References Cited

OTHER PUBLICATIONS

"Defendants Chevron U.S.A. Inc. and Scout Energy Management, LLC's Motion To Dismiss for Failure To State a Claim Under FRCP 12(B)(6)"; Civil Action No. 4:23-cv-02505; U.S. District Court Southern District of Texas Houston Division; Oct. 2, 2023; 20 pages.

"Plaintiffs' Response in Opposition To Defendants' Motion To Dismiss for Failure To State a Claim Under Frcp 12(B)(6)"; Civil Action No. 4:23-cv-02505-AHB; U.S. District Court Southern District of Texas Houston Division; Oct. 25, 2023; 27 pages.

"Defendants Chevron U.S.A. Inc.and Scout Energy Management, LLC's Reply in Support of Motion To Dismiss for Failure To State a Claim Under FRCP 12(B)(6)"; Civil Action No. 4:23-cv-02505; U.S. District Court Southern District of Texas Houston Division; Nov. 1, 2023; 6 pages.

*Scout Energy Management, LLC, and Chevron U.S.A. Inc., Petitioner* v. *Pilot Intellectual Property, LLC, Patent Owner;* "Notice of Filing Date Accorded to Petition and Time for Filing Patent Owner Preliminary Response"; Case No. IPR2024-00385; Feb. 12, 2024; 6 pages.

*Scout Energy Management, LLC, and Chevron U.S.A. Inc., Petitioner* v. *Pilot Intellectual Property, LLC,* Patent Owner; "Patent Owner's Mandatory Notices Pursuant to 37 C.F.R. § 42.8(a)(2)"; Case No. IPR2024-00385; Feb. 13, 2024; 6 pages.

*Scout Energy Management, LLC, and Chevron U.S.A. Inc., Petitioners* v. *Pilot Intellectual Property, LLC, Patent Owner;* "Patent Owner's Preliminary Response"; Case No. IPR2024-00385; May 13, 2024; 76 pages.

*Scout Energy Management, LLC, and Chevron U.S.A. Inc., Petitioners* v. *Pilot Intellectual Property, LLC, Patent Owner;* "Declaration of Trevor Bors"; Case No. IPR2024-00385; May 13, 2024; 86 pages.

"Curriculum Vitae of Trevor Bors"; Exhibit 2002, Petition for Inter Partes Review of U.S. Pat. No. 8,505,332, Case No. IPR2024-00385; May 13, 2024; 4 pages.

"Table of Similarities"; Exhibit 2004, Petition for Inter Partes Review of U.S. Pat. No. 8,505,332, Case No. IPR2024-00385; May 13, 2024; 4 pages.

Holmes, A. S., et al.; "Process Improves Acid Gas Separation"; Hydrocarbon Processing; May 1982; 8 pages.

Kent-Webb, Hannah; "Best Practices for Biological Sample Storage and Management"; Biocompare; Oct. 6, 2022; 2 pages.

Nash, J. M.; "Vortex Expansion Devices for High Temperature Cryogenics"; Proceedings of the 26th Intersociety Energy Conversion Engineering Conference; 1991; 1 page.

*Scout Energy Management, LLC, and Chevron U.S.A. Inc., Petitioners* v. *Pilot Intellectual Property, LLC, Patent Owner;* "Patent Owner's Updated Mandatory Notices Purusant to 37 C.F.R. § 42.8(a)(2)"; Case No. IPR2024-00385; Jun. 10, 2024; 7 pages.

*Scout Energy Management, LLC, and Chevron U.S.A. Inc., Petitioners* v. *Pilot Intellectual Property, LLC, Patent Owner;* "Patent Owner's Updated Exhibit List"; Case No. IPR2024-00385; Jun. 10, 2024; 6 pages.

Penflex; "Engineering Bulletin"; Exhibit 2011, Petition for Inter Partes Review of U.S. Pat. No. 8,505,332, Case No. IPR2024-00385; Jun. 10, 2024; 3 pages.

Welsh, Jenn, et al.; "Hydrate Formation in Chevron Mabee Unit for NGL Recovery and CO2 Purification for EOR"; Gas Processors Association; 2017; 10 pages.

"Prosecution History of Canadian Patent No. 2,949,039"; Exhibit 2013; Petition for Inter Partes Review, U.S. Pat. No. 8,505,332, Case No. IPR2024-00385; Jun. 10, 2024; pp. 1-200.

"Prosecution History of Canadian Patent No. 2,949,039"; Exhibit 2013; Petition for Inter Partes Review, U.S. Pat. No. 8,505,332, Case No. IPR2024-00385; Jun. 10, 2024; pp. 201-401.

*Scout Energy Management, LLC, and Chevron U.S.A. Inc., Petitioners* v. *Pilot Intellectual Property, LLC, Patent Owner;* "Petitioners' Reply to Patent Owner's Preliminary Response"; Case No. IPR2024-00385; Jun. 13, 2024; 13 pages.

Gas Processors Suppliers Association; "Engineering Data Book"; FPS Version; vols. I & II, Sections 1-26; 2004; 300 pages.

* cited by examiner

ENHANCED OIL RECOVERY STREAMS

CROSS-REFERENCE TO RELATED APPLICATIONS

This application is a continuation of U.S. patent application Ser. No. 16/733,977 filed on Jan. 3, 2020, which is a continuation of U.S. patent application Ser. No. 16/304,854 filed on Nov. 27, 2018, now U.S. Pat. No. 10,844,304, which is a U.S. National Stage of International Patent Application No. PCT/US2016/035501 filed on Jun. 2, 2016, all of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enhanced recovery methods are commonly used to increase the amount of hydrocarbons that can be recovered from a reservoir. One enhanced recovery method includes a miscible displacement process. In a miscible displacement process, a displacement fluid (e.g., carbon dioxide, light hydrocarbons, etc.) is selected that is miscible with the hydrocarbons to be recovered from the reservoir. The displacement fluid is injected into the reservoir (e.g., through an injection well) and forms a miscible solution with the hydrocarbons. Additional displacement fluid is injected into the reservoir to drive the miscible solution with the hydrocarbons out of the reservoir (e.g., through a recovery well). The hydrocarbons may be separated or at least partially separated from the displacement fluid. The hydrocarbons are then transported away as product, and the displacement fluid is reused in the miscible displacement process. While it is preferable to recover and recycle the displacement fluid, the cost associated with such in terms of plant and operating (and especially energy) remains high.

SUMMARY

The various embodiments in the disclosure address the problem of a high plant and energy cost for recovery of a displacement fluid (e.g. carbon dioxide) used in enhanced oil recovery.

In one aspect, the disclosure includes a method for recovering hydrocarbons with only two multistage columns. The method comprises receiving a carbon dioxide recycle stream, wherein the carbon dioxide recycle stream comprises carbon dioxide and $C_1$-$C_8$ hydrocarbons. The carbon dioxide recycle stream is separated in a first multistage column to produce a purified carbon dioxide recycle stream and a light hydrocarbon stream, wherein the purified carbon dioxide recycle stream comprises carbon dioxide, $C_1$-$C_4$ hydrocarbons, and is substantially free of $C_5$-$C_8$ hydrocarbons, and wherein the light hydrocarbon stream comprises carbon dioxide, $C_3$-$C_8$ hydrocarbons, trace amounts of $C_2$ hydrocarbons, and is substantially free of $C_1$ hydrocarbons. The light hydrocarbon stream is separated in a second multistage column to produce a liquefied petroleum stream and a natural gas liquids stream, wherein the liquefied petroleum stream comprises carbon dioxide, $C_3$-$C_4$ hydrocarbons, trace amounts of $C_2$ hydrocarbons, and is substantially free of $C_1$ hydrocarbons, and $C_5$-$C_8$ hydrocarbons, and wherein the natural gas liquids stream comprises $C_4$-$C_8$ hydrocarbons, trace amounts of $C_3$ hydrocarbons, and is substantially free of and $C_1$-$C_2$ hydrocarbons.

In another aspect, the disclosure includes a set of process equipment for recovering hydrocarbons with a separator, two columns, and a mixer. The separator receives an inlet stream and separates the inlet stream into a carbon dioxide recycle stream and a heavy hydrocarbons stream, wherein the inlet stream comprises nitrogen, carbon dioxide, $C_1$-$C_8$ hydrocarbons, and $C_{9+}$ hydrocarbons, wherein the heavy hydrocarbons stream comprises $C_{9+}$ hydrocarbons, and wherein the carbon dioxide recycle stream is substantially free of $C_{9+}$ hydrocarbons. A first column receives the carbon dioxide recycle stream and separates the carbon dioxide recycle stream into a purified carbon dioxide recycle stream and a light hydrocarbon stream, wherein the carbon dioxide recycle stream comprises nitrogen, carbon dioxide, and $C_1$-$C_8$ hydrocarbons, wherein the purified carbon dioxide recycle stream comprises nitrogen, carbon dioxide, $C_1$-$C_4$ hydrocarbons, and is substantially free of $C_5$-$C_8$ hydrocarbons, and wherein the light hydrocarbon stream comprises carbon dioxide, $C_3$-$C_8$ hydrocarbons, trace amounts of $C_2$ hydrocarbons, and is substantially free of nitrogen and $C_1$ hydrocarbons. A second column receives the light hydrocarbon stream and separates the light hydrocarbon stream into a liquefied petroleum stream and a natural gas liquids stream, wherein the liquefied petroleum stream comprises carbon dioxide, $C_3$-$C_4$ hydrocarbons, trace amounts of $C_2$ hydrocarbons, and is substantially free of nitrogen, $C_1$ hydrocarbons, and $C_5$-$C_8$ hydrocarbons, wherein the natural gas liquids stream comprises $C_4$-$C_8$ hydrocarbons, trace amounts of $C_3$ hydrocarbons, and is substantially free of nitrogen, carbon dioxide, and $C_1$-$C_2$ hydrocarbons, and wherein the first column and the second column are the only two multistage columns in the set of process equipment. The mixer receives the heavy hydrocarbons stream and the natural gas liquids stream and produces a blended heavy hydrocarbon stream.

In yet another aspect, the disclosure includes a system for recovering hydrocarbons with only two distillation columns. The system comprises means for receiving an inlet stream, means for separating the inlet stream into a carbon dioxide recycle stream and a heavy hydrocarbon stream, and means for receiving the carbon dioxide recycle stream. The carbon dioxide recycle stream is cooled through a first heat exchanger to produce a cooled carbon dioxide recycle stream. The cooled carbon dioxide recycle stream is fed to a first distillation column. The cooled carbon dioxide recycle stream is separated in the first distillation column to produce a first overhead stream and a first bottoms stream. The first overhead stream is heated in the first heat exchanger to produce a purified carbon dioxide recycle stream. The first bottoms stream is cooled through an air cooler to produce a cooled first bottoms stream. The cooled first bottoms stream is fed to a second distillation column. The cooled first bottoms stream is separated in the second distillation column to produce a second overhead stream and a natural gas liquids stream. The second overhead stream is expanded in an expansion valve to produce an expanded second overhead stream, and the expanded second overhead stream is heated through a second heat exchanger to produce a liquefied petroleum stream. The heavy hydrocarbons stream is mixed with the natural gas liquids stream to produce a blended heavy hydrocarbon stream.

In any of the embodiments described herein, the carbon dioxide recycle stream comprises nitrogen, the purified carbon dioxide recycle stream comprises nitrogen, the light hydrocarbon stream is substantially free of nitrogen, the liquefied petroleum stream is substantially free of nitrogen, and the natural gas liquids stream is substantially free of nitrogen.

In any of the embodiments described herein, the carbon dioxide recycle stream comprises hydrogen sulfide, the method, set of process equipment, or system comprises sacrificial hydrogen sulfide recovery to remove the hydrogen sulfide, and the sacrificial hydrogen sulfide recovery comprises using iron sponge, sulfanol, or iron chelate set of process equipment.

In any of the embodiments described herein, the liquefied petroleum stream is used as fuel to provide energy to reboilers of the first multistage column and the second multistage column.

In any of the embodiments described herein, the method, set of process equipment, or system further comprises mixing the natural gas liquids stream with a heavy hydrocarbon stream to produce a blended heavy hydrocarbon stream, wherein the blended heavy hydrocarbon stream meets energy requirements and vapor pressure requirements for transportation by truck or pipeline.

In any of the embodiments described herein, the method does not comprise any amine recovery.

In any of the embodiments described herein, the method, set of process equipment or system has an energy requirement of about 1.5-about 2.0 British thermal units per a pound (BTU/lb) of the carbon dioxide recycle stream.

In any of the embodiments described herein, the liquefied petroleum stream recovers about 8.0-about 9.0 mole % of the $C_3$-$C_4$ hydrocarbons from the carbon dioxide recycle stream, and the natural gas liquids stream recovers about 80-about 90 mole % of the $C_4$-$C_8$ hydrocarbons from the carbon dioxide recycle stream.

In any of the embodiments described herein, the liquefied petroleum stream comprises about 0.1-about 0.3 mole % of the carbon dioxide from the carbon dioxide recycle stream.

In any of the embodiments described herein, the first multistage column and the second multistage column are distillation columns and are the only two multistage columns used in recovering the hydrocarbons, the first multistage column operates at a pressure range of about 400-about 600 pounds per a square inch gauge (psig), and the second multistage column operates at a pressure range of about 300-about 600 psig.

In any of the embodiments described herein, the first multistage column and the second multistage column comprise distillation columns.

In any of the embodiments described herein, the method, set of process equipment, or system further comprises receiving an inlet stream, the inlet stream comprises nitrogen, carbon dioxide, $C_1$-$C_8$ hydrocarbons, and $C_{9+}$ hydrocarbons, and separating the inlet stream in a separator to produce the carbon dioxide recycle stream and a heavy hydrocarbons stream, the heavy hydrocarbons stream comprises $C_{9+}$ hydrocarbons, and blending the natural gas liquids stream with the heavy hydrocarbons stream.

In any of the embodiments described herein, the method, set of process equipment, or system further comprises reinjecting the purified carbon dioxide recycle stream in an injection well in an enhanced recovery set of process equipment, and recovering the liquefied petroleum stream as saleable product, the saleable product meets energy requirements and vapor pressure requirements for transportation by truck or pipeline.

In any of the embodiments described herein, the purified carbon dioxide recycle stream has a lower minimum miscibility pressure than the carbon dioxide recycle stream.

In any of the embodiments described herein, the method, set of process equipment, or system further comprises using the liquefied petroleum stream to generate energy that is used in the method, set of process equipment, or system.

In any of the embodiments described herein, no cryogenic conditions, membranes, and carbon dioxide recovery solvents are used in the method, set of process equipment or system.

In any of the embodiments described herein, the carbon dioxide recycle stream comprises about 2-about 3 mole % nitrogen, about 93-about 94 mole % carbon dioxide, and about 4-about 5 mole % $C_1$-$C_8$ hydrocarbons.

In any of the embodiments described herein, the purified carbon dioxide recycle stream comprises about 1-about 3 mole % nitrogen, about 94-about 96 mole % carbon dioxide, about 2-about 3 mole % $C_1$-$C_3$ hydrocarbons, about 0-about 1 mole % $C_4$ hydrocarbons, and about 0% $C_5$-$C_8$ hydrocarbons.

In any of the embodiments described herein, the light hydrocarbon stream comprises about 9-about 11 mole % carbon dioxide, about 89-about 91 mole % $C_3$-$C_8$ hydrocarbons, about 0-about 1 mole % $C_2$ hydrocarbons, and about 0 mole % of $C_1$ hydrocarbons and nitrogen.

In any of the embodiments described herein, the liquefied petroleum stream comprises about 55-about 57 mole % carbon dioxide, about 43-about 45 mole % $C_3$-$C_4$ hydrocarbons, about 0-about 1 mole % $C_2$ hydrocarbons, and about 0 mole % nitrogen, $C_1$ hydrocarbons, and $C_5$-$C_8$ hydrocarbons.

In any of the embodiments described herein, the natural gas liquids stream comprises about 99-about 100 mole % $C_4$-$C_8$ hydrocarbons, about 0-about 1 mole % $C_3$ hydrocarbons, and about 0 mole % nitrogen, carbon dioxide, and $C_1$-$C_2$ hydrocarbons.

BRIEF DESCRIPTION OF THE DRAWINGS

For a more complete understanding of the disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a hydrocarbon recovery process that uses two columns. The process receives a carbon dioxide recycle stream that contains hydrocarbons from an enhanced recovery process (e.g., an enhanced oil recovery process). The carbon dioxide recycle stream is separated using only two distillation columns into a purified carbon dioxide recycle stream, a liquefied petroleum gas stream, and a natural gas liquids stream. The purified carbon dioxide recycle stream is reused as injection gas in the enhanced recovery process, and the liquefied petroleum gas stream and the natural gas liquids stream may be sold as product or may be used to generate energy. For instance, the natural gas liquids stream may be blended with crude oil to increase the amount of crude oil produced from the well. It should be noted that the addition of the natural gas liquids stream to the crude oil does not cause the crude oil to fail any specifications (e.g., specifications for energy content, vapor pressure, etc.). Accordingly, embodiments may recover a liquefied petroleum gas stream and a natural gas liquids stream that may otherwise not be recovered. In one example, the liquefied petroleum gas stream recovers about 8.5 mole % of the $C_3$-$C_4$ hydrocarbons that enter the system, and the natural gas liquids stream recovers about 85 mole % of the $C_4$-$C_8$ hydrocarbons that enter the system. Embodiments may also improve (e.g., reduce) the minimum miscibility pressure of the carbon dioxide recycle stream by removing contaminants from the carbon dioxide recycle stream. Furthermore, these benefits may be realized by a set of process equipment that only has two columns (e.g., two multistage distillation columns) and that does not use any cryogenic conditions, membranes, carbon dioxide recovery solvents, or amine recovery. These and other features and benefits are described in greater detail below.

Figure 1:
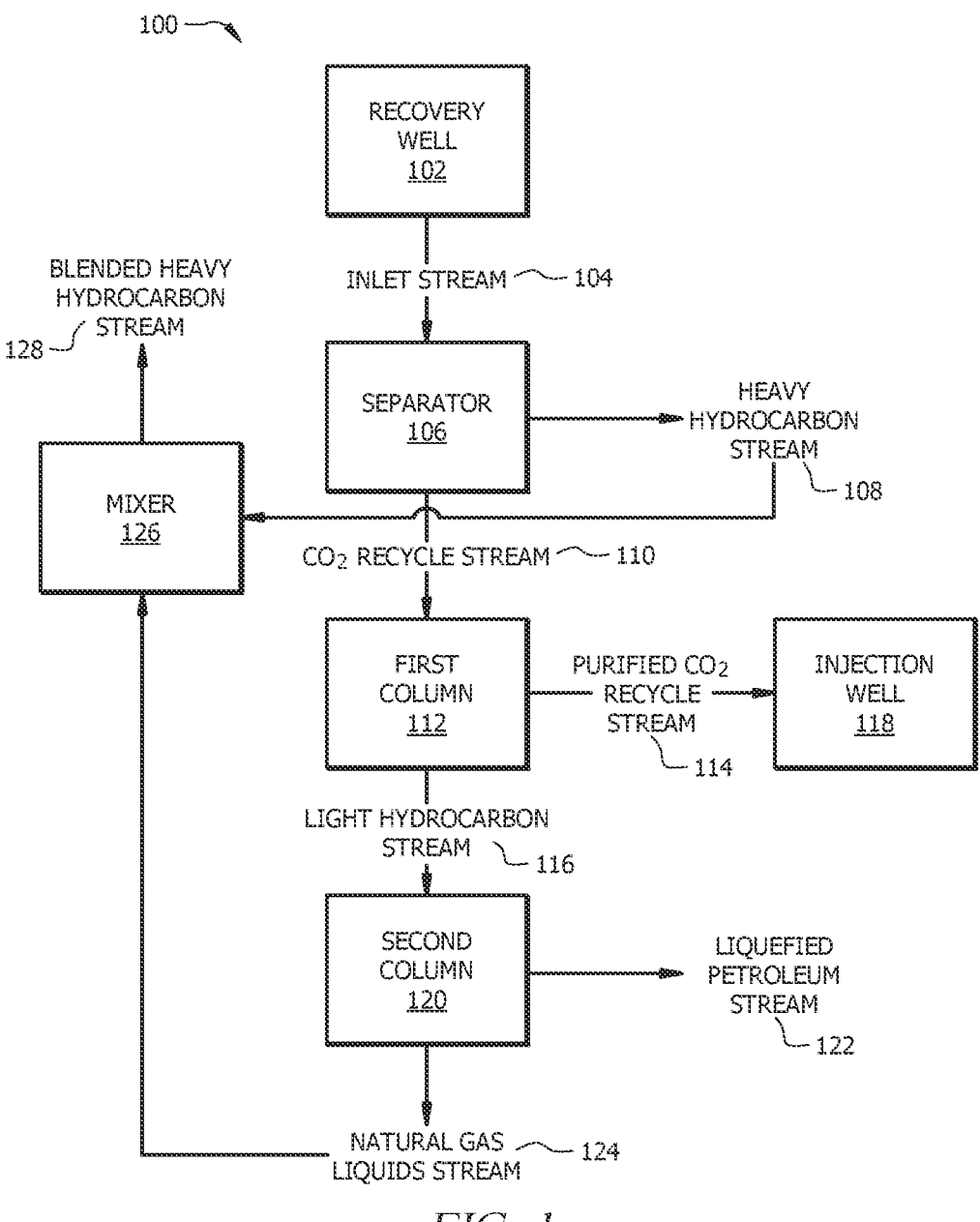
FIG. 1 is a schematic diagram of a system for recovering hydrocarbons using two columns.

FIG. 1 is a schematic diagram of a system 100 for recovering hydrocarbons using two columns. First, an inlet stream 104 is received from a recovery well 102. Although the composition of the inlet stream 104 will vary from one location to another, the inlet stream 104 may comprise carbon dioxide, natural gas, natural gas liquids (NGLs), heavy hydrocarbons, and other components (e.g., nitrogen, water, hydrogen sulfide, etc.). The term "hydrocarbon" may refer to any compound comprising, consisting essentially of, or consisting of carbon and hydrogen atoms. The term "natural gas" may refer to any hydrocarbon that may exist in a gas phase under atmospheric or downhole conditions, and includes methane and ethane, but also may include diminishing amounts of $C_3$-$C_8$ hydrocarbons. The term "natural gas liquids" or NGLs may refer to natural gases that may be liquefied without refrigeration, and may include $C_3$-$C_8$ hydrocarbons. Both natural gas and NGL are terms known in the art and are used herein as such. In contrast, the term "heavy hydrocarbons" may refer to any hydrocarbon that may exist in a liquid phase under atmospheric or downhole conditions, and generally includes liquid crude oil, which may comprise $C_{9+}$ hydrocarbons, branched hydrocarbons, aromatic hydrocarbons, and combinations thereof.

The inlet stream 104 is processed through a separator 106. The separator 106 may be any process equipment suitable for separating at least one inlet stream into a plurality of effluent streams having different compositions, states, temperatures, and/or pressures. For example, the separator 106 may be a column having trays, packing, or some other type of complex internal structure. Examples of such columns include scrubbers, strippers, absorbers, adsorbers, packed columns, and distillation columns having valve, sieve, or other types of trays. Such columns may employ weirs, downspouts, internal baffles, temperature control elements, and/or pressure control elements. Such columns also may employ some combination of reflux condensers and/or reboilers, including intermediate stage condensers and reboilers. Alternatively, the separator 106 may be a phase separator, which is a vessel that separates an inlet stream into a substantially vapor stream and a substantially liquid stream, such as a knock-out drum, flash drum, reboiler, condenser, or other heat exchanger. Such vessels also may have some internal baffles, temperature control elements, and/or pressure control elements, but generally lack any trays or other type of complex internal structure commonly found in columns. The separator 106 also may be any other type of separator, such as a membrane separator. In a specific embodiment, the separator 106 is a knockout drum. Finally, the separator 106 may be any combination of the aforementioned separators arranged in series, in parallel, or combinations thereof.

The separator 106 separates the inlet stream 104 into $C_{9+}$ hydrocarbons, which form a heavy hydrocarbons stream 108, and carbon dioxide/$C_1$-$C_8$ hydrocarbons, which forms a carbon dioxide recycle stream 110. The heavy hydrocarbons stream 108 may comprise most, if not all, of the heavy hydrocarbons from the inlet stream 104. In embodiments, the heavy hydrocarbons stream 108 may comprise at least about 90 percent, at least about 95 percent, at least about 99 percent, or substantially all of the heavy hydrocarbons from the inlet stream 104. The heavy hydrocarbons stream 108 may be sent to a pipeline for transportation, a storage tank (not shown) for storage, or a mixer 126. The carbon dioxide recycle stream 110 may comprise most of the carbon dioxide from the inlet stream 104. In embodiments, the carbon dioxide recycle stream 110 may comprise at least about 90 percent, at least about 95 percent, at least about 99 percent, or substantially all of the carbon dioxide from the inlet stream 104. Similarly, the carbon dioxide recycle stream 110 may comprise at least about 80 percent, at least about 90 percent, at least about 95 percent, or substantially all of the natural gas from the inlet stream 104. All of the percentages referred to herein are molar percentages until otherwise specified.

The heavy hydrocarbon stream 108 is then transported away as saleable product (i.e., product that meets the energy content and vapor pressure specifications for being transported away by truck, rail, pipeline, or by any other means).

At this point, the carbon dioxide recycle stream 110 may optionally be compressed in a compressor (not shown). The compressor may be any process equipment suitable for increasing the pressure, temperature, and/or density of an inlet stream. The compressor may be configured to compress a substantially vapor phase inlet stream, a substantially liquid phase inlet stream, or combinations thereof. As such, the term "compressor" may include both compressors and pumps, which may be driven by electrical, mechanical, hydraulic, or pneumatic means. Specific examples of suitable compressors include centrifugal, axial, positive displacement, turbine, rotary, and reciprocating compressors and pumps. In a specific embodiment, the compressor is a turbine compressor. Finally, the compressor may be any combination of the aforementioned compressors arranged in series, in parallel, or combinations thereof.

The compressor may produce a compressed carbon dioxide recycle stream. The compressed carbon dioxide recycle stream may contain the same composition as the carbon dioxide recycle stream 110, but at a higher energy level. The additional energy in the compressed carbon dioxide recycle stream may be obtained from energy added to the compressor, e.g., the electrical, mechanical, hydraulic, or pneumatic energy. In embodiments, difference in energy levels between the compressed carbon dioxide recycle stream and the carbon dioxide recycle stream 110 is at least about 50 percent, at least about 65 percent, or at least about 80 percent of the energy added to the compressor.

The carbon dioxide recycle stream may also optionally be dehydrated in a dehydrator (not shown). The dehydrator may remove some or substantially all of the water from the carbon dioxide recycle stream 110. The dehydrator may be any suitable dehydrator, such as a condenser, an absorber, or an adsorber. Specific examples of suitable dehydrators include refrigerators, molecular sieves, liquid desiccants such as glycol, solid desiccants such as silica gel or calcium chloride, and combinations thereof. The dehydrator also may be any combination of the aforementioned dehydrators arranged in series, in parallel, or combinations thereof. In a specific embodiment, the dehydrator is a glycol unit. Any water accumulated within or exiting from the dehydrator may be stored, used for other processes, or discarded.

The dehydrator may produce a dehydrated carbon dioxide recycle stream. The dehydrated carbon dioxide recycle stream may contain little water, e.g., liquid water or water vapor. In embodiments, the dehydrated carbon dioxide recycle stream may comprise no more than about 5 percent, no more than about 3 percent, no more than about 1 percent, or be substantially free of water.

The carbon dioxide recycle stream 110 is fed to the first column 112. The first column 112 is illustratively a multistage distillation column, but can include alternative columns such as scrubbers, strippers, absorbers, adsorbers, packed columns, or a combination of column types. Such columns may employ weirs, downspouts, internal baffles, temperature control elements, and/or pressure control elements. Such columns also may employ some combination of reflux condensers and/or reboilers, including intermediate stage condensers and reboilers. The first column 112 produces purified carbon dioxide recycle stream 114 and a light hydrocarbons stream 116. The purified carbon dioxide recycle stream 114 may comprise most or all of the nitrogen, carbon dioxide, and $C_1$-$C_3$ hydrocarbons from the carbon dioxide recycle stream, lesser amounts of $C_3$-$C_4$ hydrocarbons, and be substantially free of $C_{5+}$ hydrocarbons. For example, the purified carbon dioxide recycle stream 114 may comprise at least about 95 percent, at least about 98 percent, or at least about 99 percent of the nitrogen from the carbon dioxide recycle stream 110. Similarly, the purified carbon dioxide recycle stream 114 may comprise at least about 95 percent, at least about 98 percent, or at least about 99 percent of the carbon dioxide from the carbon dioxide recycle stream 110. In addition, the purified carbon dioxide recycle stream 114 may comprise at least about 95 percent, at least about 98 percent, or at least about 99 percent of the methane from the carbon dioxide recycle stream 110. Furthermore, the purified carbon dioxide recycle stream 114 may comprise at least about 94 percent, at least about 96 percent, or at least about 98 percent of the ethane from the carbon dioxide recycle stream 110. In contrast, the purified carbon dioxide recycle stream 114 may comprise from about 70 percent to about 95 percent, from about 75 percent to about 90 percent, or from about 80 percent to about 85 percent of the propane from the carbon dioxide recycle stream 110. Similarly, the purified carbon dioxide recycle stream 114 may comprise from about 20 percent to about 55 percent, from about 30 percent to about 42 percent, or from about 33 percent to about 39 percent of the butane from the carbon dioxide recycle stream 110.

The purified carbon dioxide recycle stream 114 may be compressed in a compressor train (not shown). The compressor train may comprise one or more compressors, such as the compressor described above. In a specific embodiment, the compressor is a turbine compressor. The compressor may compress the purified carbon dioxide recycle stream 114, thereby producing a carbon dioxide injection stream. The carbon dioxide injection stream may contain the same composition as the purified carbon dioxide recycle stream 114, but at a higher energy level. The additional energy in the carbon dioxide injection stream may be obtained from energy added to the compressor, e.g., the electrical, mechanical, hydraulic, or pneumatic energy. In some embodiments, the difference in energy levels between the carbon dioxide injection stream and the purified carbon dioxide recycle stream 114 is at least about 50 percent, at least about 65 percent, or at least about 80 percent of the energy added to the compressor.

In some embodiments, a makeup stream may be combined with either the purified carbon dioxide recycle stream 114 or the carbon dioxide injection stream. Specifically, as the system 100 is operated, carbon dioxide and other compounds will be lost, e.g., by replacing the hydrocarbons in the subterranean hydrocarbon formation, by leakage into inaccessible parts of the subterranean hydrocarbon formation 114, and/or to other causes. Alternatively, it may be desirable to increase the amount of carbon dioxide and other compounds injected downhole. As such, the makeup stream may be combined with either the purified carbon dioxide recycle stream 114 and/or the carbon dioxide injection stream, for example in the compressor. The makeup stream may comprise carbon dioxide, nitrogen, methane, ethane, air, water, or any other suitable compound. In an embodiment, the makeup stream comprises at least 90 percent, at least 95 percent, or at least 98 percent carbon dioxide, with the balance being, nitrogen, methane, ethane, air, water, or combinations thereof. Finally, the carbon dioxide injection stream may be sent to a carbon dioxide pipeline rather than being immediately injected downhole. In such a case, the carbon dioxide injection stream may meet the carbon dioxide pipeline specifications. One example of a carbon dioxide pipeline specification is: at least about 95 percent carbon dioxide, substantially free of free water, no more than about 30 pounds of vapor-phase water per million cubic feet (mmcf) of product, no more than about 20 parts per million (ppm) by weight of hydrogen sulfide, no more than about 35 ppm by weight of total sulfur, a temperature of no more than about 120 degrees Fahrenheit (° F.), no more than about four percent nitrogen, no more than about five percent hydrocarbons (wherein the hydrocarbons do not have a dew point exceeding about −20° F.), no more than about 10 ppm by weight of oxygen, and more than about 0.3 gallons of glycol per mmcf of product (wherein the glycol is not in the liquid state at the pressure and temperature conditions of the pipeline). Regardless of whether it is transported or immediately injected, the purified carbon dioxide recycle stream 114 is ultimately reinjected into an injection well 118.

The light hydrocarbon stream 116 may comprise $C_{3+}$-hydrocarbons, trace amounts of carbon dioxide and ethane, and be substantially free of nitrogen and methane. For example, the purified carbon dioxide recycle stream 114 may comprise at least about 95 percent, at least about 98 percent, or at least about 99 percent of the $C_{5+}$ from the carbon dioxide recycle stream 110. In contrast, the purified carbon dioxide recycle stream 114 may comprise from about 5 percent to about 30 percent, from about 10 percent to about 22 percent, or from about 13 percent to about 19 percent of the butane from the carbon dioxide recycle stream 110. Similarly, the purified carbon dioxide recycle stream 114 may comprise from about 20 percent to about 55 percent, from about 30 percent to about 42 percent, or from about 33 percent to about 39 percent of the propane from the carbon dioxide recycle stream 110. The purified carbon dioxide recycle stream 114 may comprise less than about 2 percent, at least about 1 percent, or at least about 0.5 percent of the ethane from the carbon dioxide recycle stream 110. Similarly, the purified carbon dioxide recycle stream 114 may comprise less than about 2 percent, at least about 1 percent, or at least about 0.5 percent of the carbon dioxide from the carbon dioxide recycle stream 110.

The light hydrocarbon stream is fed to the second column 120. Like the first column 112, the second column 120 may also be a distillation column, a scrubber, a stripper, an absorber, an adsorber, a packed column, or a combination of column types. The second column 120 produces a liquefied petroleum stream 122 and a natural gas liquids stream 124. The liquefied petroleum stream 122 comprises carbon dioxide and $C_2$-$C_3$ hydrocarbons, a trace amount of butane. For example, the liquefied petroleum stream 122 may comprise at least about 98 percent, at least about 99 percent, or at least about 99.9 percent of the carbon dioxide from the light hydrocarbon stream 116. In addition, the liquefied petroleum stream 122 may comprise at least about 98 percent, at least about 99 percent, or at least about 99.9 percent of the ethane from the light hydrocarbon stream 116. Furthermore, the liquefied petroleum stream 122 may comprise at least about 85 percent, at least about 90 percent, or at least about 94 percent of the propane from the light hydrocarbon stream 116. In contrast, the liquefied petroleum stream 122 may comprise less than about 2 percent, less than about 1 percent, or less than about 0.5 percent of the butane from the light hydrocarbon stream 116.

The natural gas liquids stream 124 comprises $C_{3+}$ hydrocarbons. For example, the natural gas liquids stream 124 may comprise at least about 98 percent, at least about 99 percent, or at least about 99.9 percent of the $C_{5+}$ from the light hydrocarbon stream 116. Similarly, the natural gas liquids stream 124 may comprise at least about 98 percent, at least about 99 percent, or at least about 99.5 percent of the butane from the light hydrocarbon stream 116. In contrast, the natural gas liquids stream 124 may comprise less than about 15 percent, less than about 10 percent, or less than about 6 percent of the propane from the light hydrocarbon stream 116.

Both the liquefied petroleum stream 122 and natural gas liquids stream 124 can be used to generate energy or can be transported away (e.g., pipe, truck, rail, etc.) as saleable product. Additionally, the natural gas liquids stream 124 can be blended with crude oil to increase the production of crude oil from the well. For instance, the natural gas liquids stream 124 can be mixed in a mixer 126 with the heavy hydrocarbons stream 108 to produce a blended heavy hydrocarbon stream 128. It should be noted that the addition of the natural gas liquids stream 124 to the heavy hydrocarbons stream 108 does not cause the heavy hydrocarbons stream 108 to fail any specifications (e.g., specifications for energy content, vapor pressure, etc.). If hydrogen sulfide is present in carbon dioxide recycle stream 110, system 100 may optionally include hydrogen sulfide processing (e.g., sacrificial hydrogen sulfide recovery) to remove the hydrogen sulfide. For example, system 100 may use iron sponge, sulfanol, or iron chelate processing positioned on the liquefied petroleum stream 122 any/or the natural gas liquids stream 124.

Figure 2:
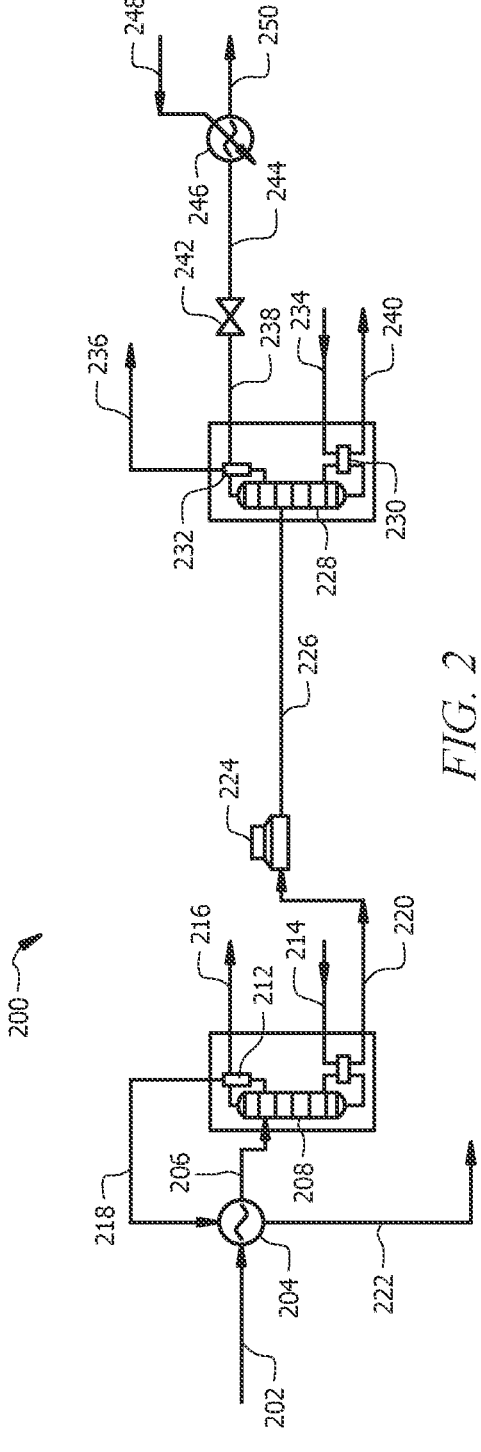
FIG. 2 is a detailed diagram of a system for recovering hydrocarbons using two columns.

FIG. 2 is a detailed diagram of a system 200 for recovering hydrocarbons using two columns. The system 200 corresponds to system 100 in FIG. 1, but the system 200 is shown in greater detail. A carbon dioxide recycle stream 202 is received. The carbon dioxide recycle stream 202 may comprise nitrogen, carbon dioxide, and $C_1$-$C_8$ hydrocarbons. The carbon dioxide recycle stream 202 may also comprise water, hydrogen sulfide, and any other components. For instance, the carbon dioxide recycle stream 202 may comprise about 2-about 3 mole % nitrogen, about 93-about 94 mole % carbon dioxide, and about 4-about 5 mole % $C_1$-$C_8$ hydrocarbons. If water is present in carbon dioxide recycle stream 202, system 200 may optionally include a dehydrator (e.g., a molecular sieve), and if hydrogen sulfide is present in carbon dioxide recycle stream 202, system 200 may optionally include processing to remove the hydrogen sulfide.

The carbon dioxide recycle stream 202 is passed through a heat exchanger 204 to produce a cooled carbon dioxide recycle stream 206. The cooled carbon dioxide recycle stream 206 is fed to the first column 208. The first column 208 may include any of the types of columns listed for the first column 112 in FIG. 1. Additionally, the first column 208 may include a reboiler and/or a condenser. In the example shown in FIG. 2, the first column 208 has a reboiler 210 and a condenser 212. The reboiler 210 receives a reboiler energy stream 214 to power the reboiler 210, and the condenser 212 generates a condenser energy stream 216.

The first column 208 operates in a pressure range from about 400 pounds per a square inch gauge (psig) to about 600 psig and produces an overhead stream 218 and a bottoms stream 220. The overhead stream 218 may comprise nitrogen, carbon dioxide, $C_1$-$C_3$ hydrocarbons, trace amounts of $C_4$ hydrocarbons, and may be substantially or completely free of $C_5$-$C_8$ hydrocarbons. For instance, the overhead stream 218 may comprise about 1-about 3 mole % nitrogen, about 94-about 96 mole % carbon dioxide, about 2-about 3 mole % $C_1$-$C_3$ hydrocarbons, about 0-about 1 mole % $C_4$ hydrocarbons, and about 0% $C_5$-$C_8$ hydrocarbons. The bottoms stream 220 may comprise carbon dioxide, $C_3$-$C_8$ hydrocarbons, trace amounts of $C_2$ hydrocarbons, and may be substantially or completely free of $C_1$ hydrocarbons and nitrogen. For instance, the bottoms stream 220 may comprise about 9-about 11 mole % carbon dioxide, about 89-about 91 mole % $C_3$-$C_8$ hydrocarbons, about 0-about 1 mole % $C_2$ hydrocarbons, and about 0 mole % of $C_1$ hydrocarbons and nitrogen. The overhead stream 218 is heated through heat exchanger 204 to produce the purified carbon dioxide recycle stream 222 that may be used as injection gas in an enhanced recovery process.

The bottoms stream 220 is processed through a cooler (e.g., an air cooler or other heat exchanger) to produce a cooled bottoms stream 226 that is fed to the second column 228. The second column 228 may include any of the types of columns listed for the first column 112 in FIG. 1. Additionally, the second column 228 may include a reboiler and/or a condenser. In the example shown in FIG. 2, the second column 228 has a reboiler 230 and a condenser 232. The reboiler 230 receives a reboiler energy stream 234 to power the reboiler 230, and the condenser 232 generates a condenser energy stream 236.

The second column 228 operates in a pressure range from about 300 psig to about 600 psig and produces an overhead stream 238 and a natural gas liquids stream 240. The overhead stream 238 may comprise carbon dioxide, $C_3$-$C_4$ hydrocarbons, trace amounts of $C_2$ hydrocarbons, and may be substantially or completely free of nitrogen, $C_1$ hydrocarbons, and $C_5$-$C_8$ hydrocarbons. For instance, the overhead stream 238 may comprise about 55-about 57 mole % carbon dioxide, about 43-about 45 mole % $C_3$-$C_4$ hydrocarbons, about 0-about 1 mole % $C_2$ hydrocarbons, and about 0 mole % nitrogen, $C_1$ hydrocarbons, and $C_5$-$C_8$ hydrocarbons. The natural gas liquids stream 240 may comprise $C_4$-$C_8$ hydrocarbons, trace amounts of $C_3$ hydrocarbons, and may be substantially or completely free of nitrogen, carbon dioxide, and $C_1$-$C_2$ hydrocarbons. For instance, the natural gas liquids stream 240 may comprise about 99-about 100 mole % $C_4$-$C_8$ hydrocarbons, about 0-about 1 mole % $C_3$ hydrocarbons, and about 0 mole % nitrogen, carbon dioxide, and $C_1$-$C_2$ hydrocarbons. The natural gas liquids stream 240 may be sold as product or may be used to generate energy. For instance, the natural gas liquids stream 240 may be blended with crude oil to increase the amount of crude oil produced from the well, or the natural gas liquids stream 240 can fuel the reboilers for the first column 208 and the second column 228.

The overhead stream 238 is expanded through an expansion valve 242 to produce an expanded overhead stream 244 that has a lower temperature and a lower pressure than the overhead stream 238, and the expanded overhead stream 244 is passed through a heat exchanger 246. The heat exchanger 246 uses a heat exchanger energy stream 248 to cool the expanded overhead stream 244 and produce the liquefied petroleum stream 250. The liquefied petroleum stream 250 may be sold as product or may be used to generate energy.

It is worth noting that in an embodiment that the system 200 requires about 900,000-about 1,100,000 British thermal units per hour (BTU/hr) for a carbon dioxide recycle stream 202 of about 500,000-about 700,000 pounds per hour (lb/hr) that results in a natural gas liquids stream 240 of about 12,000-about 14,000 lb/hr and a liquefied petroleum stream 250 of about 1,000-about 2,000 lb/hr. Accordingly, the system 200 has an energy requirement of about 1.5-2.0 BTU/lb of carbon dioxide recycle stream 202. The liquefied petroleum gas stream 250 recovers about 8.0-about 9.0 mole % of the $C_3$-$C_4$ hydrocarbons that enter the system 200, and the natural gas liquids stream 240 recovers about 80-about 90 mole % of the $C_4$-$C_8$ hydrocarbons that enter the system 200. Additionally, the liquefied petroleum stream 250 comprises about 0.1-about 0.3 mole % of the carbon dioxide from the carbon dioxide recycle stream 202.

In one example, a process simulation was performed using the system 200 of recovering carbon dioxide using two columns shown in FIG. 2. The simulation was performed using Aspen Technology Inc.'s HYSYS version 8.8 software package. The specified values are indicated by an asterisk (*). The physical properties are provided in degrees Fahrenheit (F.), psig, million standard cubic feet per day (MMSCFD), lb/hr, barrels per a day (barrel/day), and Btu/hr. The material streams, their compositions, and the associated energy streams produced by the simulation are provided in Tables 1, 2, and 3 below, respectively.

TABLE 1A

| | Material Streams | | | | |
|---|---|---|---|---|---|
| Name | Purified Carbon Dioxide Recycle Stream 222 | Cooled Bottoms Stream 226 | Overhead Stream 218 | Bottoms Stream 220 | Carbon Dioxide Recycle Stream 202 |
| Vapor Fraction | 1.0000 | 0.0000 | 1.0000 | 0.0000 | 0.9999 |
| Temperature (F.) | 84.43 | 100.0* | 29.2 | 297.5 | 100.0* |
| Pressure (psig) | 497.0 | 495.0 | 500.0 | 500.0 | 525.0* |
| Molar Flow (MMSCFD) | 118.2 | 1.755 | 118.200 | 1.755 | 120.0* |
| Mass Flow (lb/hr) | 5.606E+05 | 1.409E+04 | 5.606E+05 | 1.409E+04 | 5.747E+05 |
| Liquid Volume Flow (barrel/day) | 4.744E+04 | 1498 | 4.744E+04 | 1498 | 4.894E+04 |
| Heat Flow (Btu/hr) | −2.109E+09 | −1.672E+07 | −1.492E+07 | −1.492E+07 | −2.123E+09 |

TABLE 1B

| | Material Streams | | | | |
|---|---|---|---|---|---|
| Name | Cooled Carbon Dioxide Recycle Stream 206 | Overhead Stream 238 | Natural Gas Liquids Stream 240 | Expanded Overhead Stream 244 | Liquefied Petroleum Stream 250 |
| Vapor Fraction | 0.9858 | 1.0000 | 0.0000 | 1.0000 | 1.0000 |
| Temperature (F.) | 50.00* | 91.34 | 380.9 | 30.29 | 70.00* |
| Pressure (psig) | 520.0 | 400.0 | 400.0 | 50.00* | 45.00 |
| Molar Flow (MMSCFD) | 120.0 | 0.3127 | 1.443 | 2.286 | 0.3127 |
| Mass Flow (lb/hr) | 5.747E+05 | 1.514E+03 | 1.257E+04 | 8.11E+03 | 1.514E+03 |
| Liquid Volume Flow (barrel/day) | 4.894E+04 | 160.3 | 1337 | 1311 | 160.3 |
| Heat Flow (Btu/hr) | −2.133E+09 | −3.964E+06 | −1.015E+07 | −1.175E+07 | −3.946E+06 |

TABLE 2A

| | Stream Compositions | | | | |
|---|---|---|---|---|---|
| Name | Purified Carbon Dioxide Recycle Stream 222 | Cooled Bottoms Stream 226 | Overhead Stream 218 | Bottoms Stream 220 | Carbon Dioxide Recycle Stream 202 |
| Comp Mole Frac (Nitrogen) | 0.0213 | 0.0000 | 0.0213 | 0.0000 | 0.0210* |
| Comp Mole Frac (CO2) | 0.9497 | 0.1001 | 0.9497 | 0.1001 | 0.9373* |
| Comp Mole Frac (Methane) | 0.0169 | 0.0000 | 0.0169 | 0.0000 | 0.0167* |
| Comp Mole Frac (Ethane) | 0.0035 | 0.0003 | 0.0035 | 0.0003 | 0.0035* |
| Comp Mole Frac (Propane) | 0.0063 | 0.0810 | 0.0063 | 0.0810 | 0.0074* |
| Comp Mole Frac (i-Butane) | 0.0009 | 0.0585 | 0.0009 | 0.0585 | 0.0017* |
| Comp Mole Frac (n-Butane) | 0.0013 | 0.2081 | 0.0013 | 0.2081 | 0.0043* |
| Comp Mole Frac (i-Pentane) | 0.0000 | 0.0874 | 0.0000 | 0.0874 | 0.0013* |
| Comp Mole Frac (n-Pentane) | 0.0000 | 0.0954 | 0.0000 | 0.0954 | 0.0014* |
| Comp Mole Frac (n-Hexane) | 0.0000 | 0.1367 | 0.0000 | 0.1367 | 0.0020* |
| Comp Mole Frac (n-Heptane) | 0.0000 | 0.1367 | 0.0000 | 0.1367 | 0.0020* |
| Comp Mole Frac (n-Octane) | 0.0000 | 0.0957 | 0.0000 | 0.0957 | 0.0014* |
| Comp Mole Frac (H2O) | 0.0000 | 0.0000 | 0.0000 | 0.0000 | 0.0000* |
| Comp Mole Frac (H2S) | 0.0000 | 0.0000 | 0.0000 | 0.0000 | 0.0000* |

TABLE 2B

| | Stream Compositions | | | | |
|---|---|---|---|---|---|
| Name | Cooled Carbon Dioxide Recycle Stream 206 | Overhead Stream 238 | Natural Gas Liquids Stream 240 | Expanded Overhead Stream 244 | Liquefied Petroleum Stream 250 |
| Comp Mole Frac (Nitrogen) | 0.0210 | 0.0000 | 0.0000 | 0.0000 | 0.0000 |
| Comp Mole Frac (CO2) | 0.9373 | 0.5617 | 0.0000 | 0.5617 | 0.5617 |
| Comp Mole Frac (Methane) | 0.0167 | 0.0000 | 0.0000 | 0.0000 | 0.0000 |
| Comp Mole Frac (Ethane) | 0.0035 | 0.0017 | 0.0000 | 0.0017 | 0.0017 |
| Comp Mole Frac (Propane) | 0.0074 | 0.4315 | 0.0050 | 0.4315 | 0.4315 |
| Comp Mole Frac (i-Butane) | 0.0017 | 0.0041 | 0.0703 | 0.0041 | 0.0041 |
| Comp Mole Frac (n-Butane) | 0.0043 | 0.0009 | 0.2529 | 0.0009 | 0.0009 |
| Comp Mole Frac (i-Pentane) | 0.0013 | 0.0000 | 0.1064 | 0.0000 | 0.0000 |
| Comp Mole Frac (n-Pentane) | 0.0014 | 0.0000 | 0.1161 | 0.0000 | 0.0000 |
| Comp Mole Frac (n-Hexane) | 0.0020 | 0.0000 | 0.1664 | 0.0000 | 0.0000 |
| Comp Mole Frac (n-Heptane) | 0.0020 | 0.0000 | 0.1664 | 0.0000 | 0.0000 |
| Comp Mole Frac (n-Octane) | 0.0014 | 0.0000 | 0.1165 | 0.0000 | 0.0000 |
| Comp Mole Frac (H2O) | 0.0000 | 0.0000 | 0.0000 | 0.0000 | 0.0000 |
| Comp Mole Frac (H2S) | 0.0000 | 0.0000 | 0.0000 | 0.0000 | 0.0000 |

TABLE 3

| Energy Streams | |
|---|---|
| Name | Heat Flow (Btu/hr) |
| Reboiler Energy Stream 214 | 1.390E+07 |
| Condenser Energy Stream 216 | 1.554E+07 |
| Condenser Energy Stream 236 | 8.449E+05 |
| Reboiler Energy Stream 234 | 3.451E+06 |
| Heat Exchanger Energy Stream 248 | 1.816E+04 |

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R = R_l + k*(R_u - R_l)$, wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The term "about" as used herein is defined as +/−10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving a carbon dioxide recycle stream, wherein the carbon dioxide recycle stream includes carbon dioxide, methane, ethane, propane, i-butane, n-butane, pentane, and hexane plus hydrocarbons;
   separating, by a first multistage distillation column, the carbon dioxide recycle stream into a first overhead stream and a first bottoms stream, wherein the first multistage distillation column operates in a pressure range of about 400 pounds per a square inch gauge (psig) to about 600 psig, wherein the first overhead stream comprises a first portion of the carbon dioxide, the methane, and the ethane, and wherein the first bottoms stream comprises a second portion of the carbon dioxide, the propane, the i-butane, the n-butane, the pentane, and the hexane plus hydrocarbons;
   separating, by a second multistage distillation column, the first bottoms stream into a second overhead stream and a second bottoms stream, wherein the second multistage distillation column operates in a pressure range of about 300 psig to about 600 psig, wherein the second overhead stream comprises the second portion of the carbon dioxide, and wherein the second bottoms stream comprises the propane, the i-butane, the n-butane, the pentane, the hexane plus hydrocarbons, and hydrogen sulfide; and
   performing hydrogen sulfide processing on the second bottoms stream to remove the hydrogen sulfide.

2. The method of claim 1, wherein the carbon dioxide recycle stream further comprises water, and wherein the method further comprises dehydrating the carbon dioxide recycle stream before separating the carbon dioxide recycle stream into the first overhead stream and the first bottoms stream.

3. The method of claim 2, wherein dehydrating the carbon dioxide recycle stream comprises dehydrating the carbon dioxide recycle stream using glycol processing.

4. The method of claim 3, wherein dehydrating the carbon dioxide recycle stream further comprises dehydrating the carbon dioxide recycle stream using the glycol processing to produce a water stream and a dehydrated carbon dioxide recycle stream, wherein the water stream comprises the water, and wherein the dehydrated carbon dioxide recycle stream comprises the carbon dioxide, the methane, the ethane, the propane, the i-butane, the n-butane, the pentane, and the hexane plus hydrocarbons.

5. The method of claim 3, wherein a first mole fraction of the first portion of the carbon dioxide in the first overhead stream is greater than a second mole fraction of the methane in the first overhead stream.

6. The method of claim 1, further comprising:
   receiving a feed stream, wherein the feed stream comprises the carbon dioxide, the methane, the ethane, the propane, the i-butane, the n-butane, the pentane, and the hexane plus hydrocarbons; and
   separating the feed stream into the carbon dioxide recycle stream and a heavy hydrocarbons stream, wherein the heavy hydrocarbons stream includes $C_{9+}$ hydrocarbons.

7. The method of claim 1, further comprising compressing the carbon dioxide recycle stream before separating the carbon dioxide recycle stream into the first overhead stream and the first bottoms stream.

8. The method of claim 1, further comprising adding a makeup stream of carbon dioxide to the first overhead stream to form a carbon dioxide injection stream.

9. The method of claim 1, wherein no cryogenic conditions, membranes, or carbon dioxide recovery solvents are used in the method.

10. The method of claim 1, wherein the carbon dioxide recycle stream further comprises the hydrogen sulfide.

11. The method of claim 1, wherein the second overhead stream comprises a liquefied petroleum stream, and wherein the liquefied petroleum stream comprises the second portion of the carbon dioxide and a third portion of the ethane and the propane.

12. The method of claim 1, further comprising:
   receiving, by a cooler, the first bottoms stream from the first multistage distillation column;
   cooling, by the cooler, the first bottoms stream; and
   transferring, by the cooler, the first bottoms stream to the second multistage distillation column.

13. The method of claim 12, wherein separating, by the second multistage distillation column, the first bottoms stream into the second overhead stream and the second bottoms stream comprises:
   condensing, by a condenser, a portion of the second overhead stream to return the portion of the second overhead stream to the second multistage distillation column; and
   reboiling, by a reboiler, a portion of the second bottoms stream to return the portion of the second bottoms stream to the second multistage distillation column.

14. A method comprising:
   receiving a carbon dioxide recycle stream, wherein the carbon dioxide recycle stream includes water, carbon dioxide, methane, ethane, propane, i-butane, n-butane, pentane, and hexane plus hydrocarbons;

dehydrating the carbon dioxide recycle stream using glycol processing to produce a water stream and a dehydrated carbon dioxide recycle stream, wherein the water stream comprises the water, and wherein the dehydrated carbon dioxide recycle stream comprises the carbon dioxide, the methane, the ethane, the propane, the i-butane, the n-butane, the pentane, and the hexane plus hydrocarbons;

separating, by a first multistage distillation column, the dehydrated carbon dioxide recycle stream into a first overhead stream and a first bottoms stream, wherein the first multistage distillation column operates in a pressure range of about 400 pounds per a square inch gauge (psig) to about 600 psig, wherein the first overhead stream comprises a first portion of the carbon dioxide, the methane, and the ethane, and wherein the first bottoms stream comprises a second portion of the carbon dioxide, the propane, the i-butane, the n-butane, the pentane, and the hexane plus hydrocarbons; and separating, by a second multistage distillation column, the first bottoms stream into a second overhead stream and a second bottoms stream, wherein the second multistage distillation column operates in a pressure range of about 300 psig to about 600 psig, wherein the second overhead stream comprises the second portion of the carbon dioxide, and wherein the second bottoms stream comprises the propane, the i-butane, the n-butane, the pentane, the hexane plus hydrocarbons, and hydrogen sulfide; and performing hydrogen sulfide processing on the second bottoms stream to remove the hydrogen sulfide.

15. The method of claim 14 wherein the carbon dioxide recycle stream further comprises the hydrogen sulfide.

16. The method of claim 14, further comprising:

compressing the carbon dioxide recycle stream before separating the carbon dioxide recycle stream into the first overhead stream and the first bottoms stream; and adding a makeup stream of carbon dioxide to the first overhead stream to form a carbon dioxide injection stream.

17. A process of separation implemented by a set of process equipment, wherein the process of separation comprises:

receiving, by first piping, a carbon dioxide recycle stream, wherein the carbon dioxide recycle stream includes carbon dioxide, methane, ethane, propane, i-butane, n-butane, pentane, and hexane plus hydrocarbons;

separating, by a first multistage distillation column, the carbon dioxide recycle stream into a first overhead stream and a first bottoms stream, wherein the first multistage distillation column operates in a pressure range of about 400 pounds per a square inch gauge (psig) to about 600 psig, wherein the first overhead stream comprises a first portion of the carbon dioxide, the methane, and the ethane, and wherein the first bottoms stream comprises a second portion of the carbon dioxide, the propane, the i-butane, the n-butane, the pentane, and the hexane plus hydrocarbons; and separating, by a second multistage distillation column, the first bottoms stream into a second overhead stream and a second bottoms stream, wherein the second multistage distillation column operates in a pressure range of about 300 to about 600 psig, wherein the second overhead stream comprises the second portion of the carbon dioxide, and wherein the second bottoms stream comprises the propane, the i-butane, the n-butane, the pentane, the hexane plus hydrocarbons, and hydrogen sulfide;

performing hydrogen sulfide processing on the second bottoms stream to remove the hydrogen sulfide.

18. The process of separation of claim 17, further comprising dehydrating, by a dehydrator coupled to the first piping and the first multistage distillation column, the carbon dioxide recycle stream to remove water from the carbon dioxide recycle stream.

19. The process of separation of claim 18, wherein dehydrating the carbon dioxide recycle stream comprises dehydrating, by the dehydrator using glycol processing, the carbon dioxide recycle stream.

20. The process of separation of claim 17, further comprising:

receiving, by second piping, a feed stream, wherein the feed stream comprises the carbon dioxide, the methane, the ethane, the propane, the i-butane, the n-butane, the pentane, and the hexane plus hydrocarbons; and separating, by a separator coupled to the second piping, the feed stream into the carbon dioxide recycle stream and a heavy hydrocarbons stream, wherein the heavy hydrocarbons stream includes $C_{9+}$ hydrocarbons.

21. The process of separation of claim 17, further comprising compressing, by a compressor, the carbon dioxide recycle stream before passing the carbon dioxide recycle stream to the first multistage distillation column.

22. The process of separation of claim 17, further comprising adding, by second piping, a makeup stream of carbon dioxide to the first overhead stream to form a carbon dioxide injection stream.

23. The process of separation of claim 17, wherein the carbon dioxide recycle stream further comprises the hydrogen sulfide.

* * * * *